United States Patent

[11] 3,584,635

[72] Inventor Raymond W. Warren
McLean, Va.
[21] Appl. No. 814,036
[22] Filed Apr. 7, 1969
[45] Patented June 15, 1971
[73] Assignee The United States of America as represented by the Secretary of the Army

[54] SETTABLE FLUIDIC COUNTER
8 Claims, 1 Drawing Fig.

[52] U.S. Cl. 137/81.5, 235/201
[51] Int. Cl. F15c 1/12
[50] Field of Search 137/8.15; 235/200 R, 201 PF

[56] References Cited

UNITED STATES PATENTS

| | | | |
|---|---|---|---|
| 3,228,410 | 1/1966 | Warren et al. | 137/81.5 |
| 3,232,305 | 2/1966 | Groeber | 137/81.5 |
| 3,417,770 | 12/1968 | Denison | 137/81.5 |
| 3,425,432 | 2/1969 | Langley | 137/81.5 |
| 3,468,326 | 9/1969 | Cohen | 137/81.5 |
| 3,474,805 | 10/1969 | Swartz | 137/81.5 X |
| 3,495,609 | 2/1970 | Swartz | 137/81.5 |

*Primary Examiner*—Samuel Scott
*Attorneys*—Harry M. Saragovitz, Edward J. Kelly, Herbert Berl and J. D. Edgerton

ABSTRACT: A settable fluidic binary counter stage which includes a pair of pure fluidic amplifiers. The outputs of the first fluidic amplifier are fed back with resistors in the path thereof to the control inputs of the second fluidic amplifier. The outputs of the second fluidic amplifier are connected to the control inputs of the first fluidic amplifier in such a manner as to form a control loop. If a set pulse is applied to one of the control inputs of the second fluidic amplifier and then removed, the counter stage will be stably set in its desired mode of operation and ready to count upon the receipt of a count pulse. Any number of such counter stages may be cascaded and randomly set to a desired condition and the stages thereof will retain such a state after the setting pulses are removed, despite the order of their removal.

PATENTED JUN 1 5 1971
3,584,635
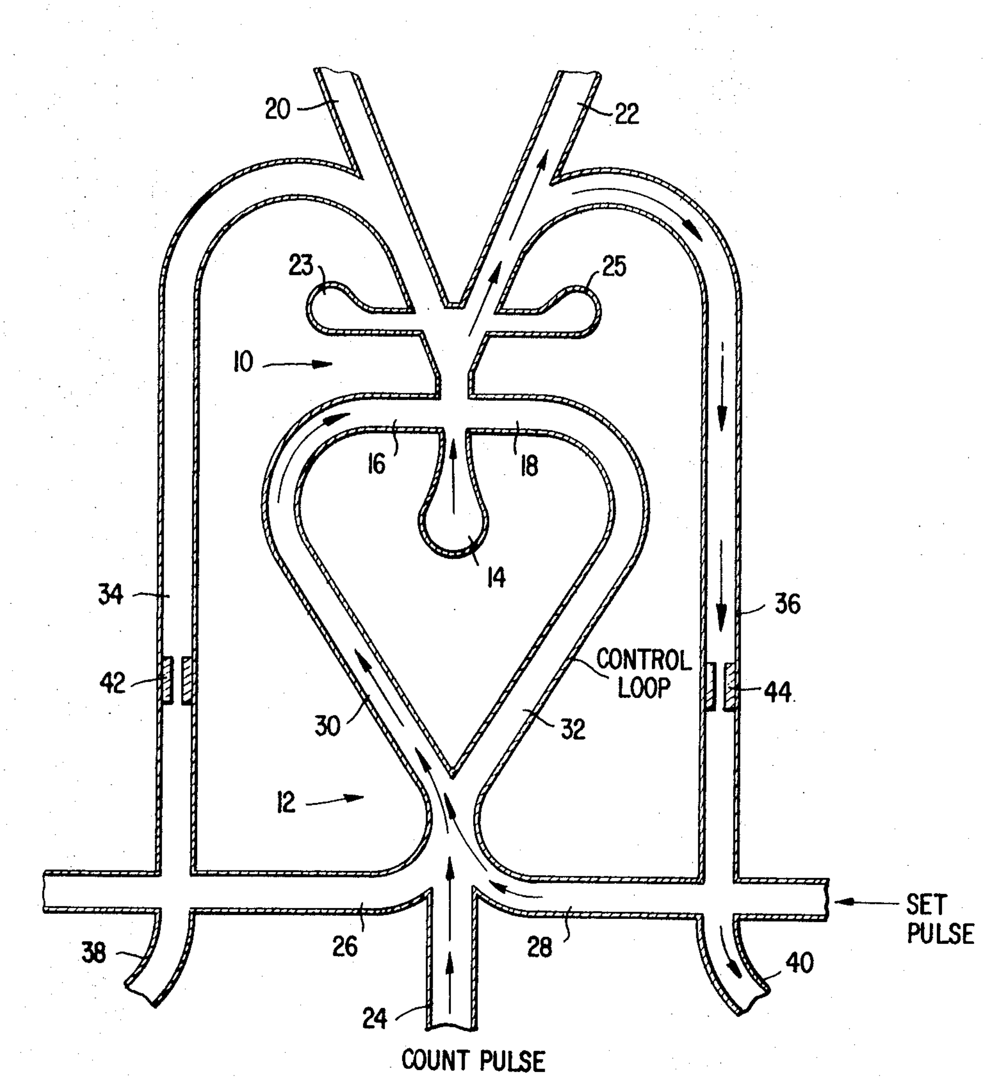
INVENTOR
RAYMOND W. WARREN
BY Harry M. Saragovitz, Edward J. Kelly, Herbert Berl & J. D. Edgerton
ATTORNEYS

SETTABLE FLUIDIC COUNTER

BACKGROUND OF THE INVENTION

This invention relates to fluidic counter devices and more particularly to a binary settable fluidic counter using pure fluid amplifiers.

In the past, binary fluid counters existed which were easy to set so that all of the stages thereof would read logical "ones" as their outputs exhausted overboard. Such a counter would remain in a stable all "one" situation when the setting means was removed therefrom. Also in the past, while settable fluid counters existed, they were highly unstable and the sequence of applying setting pulses and the order of removing the same was critical to the proper setting of the counter.

Thus, while somewhat satisfactory, a need existed for a fluidic counter device wherein the stages thereof could be randomly set to either logical "one" or "zero" as desired and whereupon when the setting pulses are removed the counter will remain stable with the desired number set therein.

For example, let us assume the presence of a six stage fluid counter. Let us also assume that it is desired to perform a control operation at the binary count 11. If initially the binary fluidic counter was to read all "zeros" then the eleventh count output would be provided at stages 4, 2 and 1. Accordingly, it will take three output stage positions to indicate the presence of the desired eleventh count control. As such, a sophisticated logical detection would have to be provided in order to obtain this desired position. However, if initially the counter stages were set to a count 21 by setting stages 5, 3 and 1 thereof, then an 11 count output thereafter would occur when the counter stages read 32. This would occur when stage 6 only has an output therefrom. Here only one output would be needed to provide the desired control operation and sophisticated logical detection circuitry would thereby be eliminated.

By way of example, a control pulse at a desired count is useful in military and industrial systems, such as the making of a tool, the firing of a rocket, the starting of an engine or any number of other initiating operations.

SUMMARY

Accordingly, it is an object of the present invention to provide a new and improved fluidic counter.

Another object of the subject invention is the provision of a new and improved binary fluidic counter employing pure fluidic devices.

Still another object of this invention is to provide a new and improved binary fluidic counter, the stages of which may be randomly set at will.

A further object of the present invention is to provide a new and improved binary settable fluidic counter which possesses a high degree of stability.

One other object of this invention is the provision of a new and improved binary fluidic counter which will remain in a stable set condition when the applied setting pulses thereto are removed in any order.

These and other objects of the hereinafter described invention are attained by the provision of a pair of pure fluid amplifiers which are interconnected to form a counter stage that may be cascaded with other like stages such that the individual stages thereof may be randomly set and remain in a stable set condition despite the disorderly removal of the set pulses therefrom.

BRIEF DESCRIPTION OF THE DRAWINGS

A more complete appreciation of the invention and many of the attendant advantages thereof will be readily apparent as the same becomes better understood by reference to the following detailed description when considered in connection with the accompanying solitary view which illustrates a single stage of a settable fluidic counter in accordance with the present invention.

BRIEF DESCRIPTION OF THE PREFERRED EMBODIMENT

Referring now to the drawing, a stage of a settable fluidic counter according to the present invention is shown as including a first pure fluidic amplifier 10 and second pure fluidic amplifier 12. The first pure fluidic amplifier 10 includes a power jet 14, left and right control channels 16 and 18, and left and right output channels 20 and 22. Additionally, vents 23 and 25 are provided as an exhaust for excess flow received from the power jet 14. Similarly, the second pure fluidic amplifier 12 includes a power jet 24, left and right control or counter setting channels 26 and 28 and left and right output channels 30 and 32.

In operation, the power jet 14 of the first pure fluidic amplifier 10 is energized by a source of power, such for example as by a conventional compressor or pump and a pulse of air from a conventional pulse source is injected into a given one of the counter setting channels, for example the right counter setting channel 28. Understanding that the respective output channels 30 and 32 of the second fluidic amplifier 12 are connected to the control input 16 and 18 of the first fluidic amplifier 10 to thereby form a control loop, it is apparent that the set pulse applied to the control channel 28 will flow up the left side of the control loop and thus up through output channel 30 thereby switching the flow within the first amplifier stage 10 to the right output channel 22 thereof. Now, if a pulse enters the control loop through input jet 24 from a prior counter stage being set this pulse will join the set pulse applied to the setting channel 28 and will be directed up the left side of the control loop so as to continue to influence the flow of power jet 14 to the right output channel 22. Accordingly, it is seen that the setting of a preceding counter stage will not buck the random setting of a succeeding stage, but instead will enhance the effect thereof. Moreover, feedback channels 34 and 36 are provided to direct any counter stage output flow to join the control setting pulse. For example, a portion of the flow in the right output channel 2 of the first pure fluidic amplifier 10 will feed back through right feedback channel 36 and a portion thereof will join the setting pulse channel 28. Any excess flow through the feedback channel will exit through an appropriate vent 38 or 40.

When the set pulse, such for example as the set pulse applied to the setting channel 28, is removed, it will no longer influence the feedback flow through channel 36 and the same will accordingly exit through vent 40. The effect of the exiting flow is to aspirate flow from the right side of control loop channel and to thereby lower the pressure thereof. The power jet 14 will also cause aspiration from the right side of the control loop and thereby lower the pressure thereof.

Now, when a count pulse enters the control loop through power jet 24, the flow from the left set channel 26 toward the low pressure in the right side of the control loop will induce the count pulse to enter the right side of the control loop and flip the mode of operation of the first pure fluid amplifier 10 to the left output channel 20, thereby giving frequency division and the capability of binary counting.

Additionally, resistors 42 and 44 have been respectively provided within each of the feedback channels 34 and 36 to prevent any instability or oscillation that may occur when there is flow from a previous counter stage in the control loop upon the removal of a setting pulse. The resistors also prevent the aspiration from the feedback flow from causing too low of a pressure drop in the control loop channel, which without could cause the flow in the control loop to switch channels and cause an oscillating condition.

It should now be apparent that the fluidic counter of the herein described invention allows for the random setting of the stages thereof with good stability upon the removing of the setting pulses therefrom. It should also be apparent that while the fluidic counter of the subject invention has been described with particular reference to a single stage that it is not so limited and that any number of desired stages may be cascaded.

Obviously, numerous modifications and variations are possible in light of the above teachings. It is therefore to be understood that within the scope of the appended claims the invention may be practiced otherwise then as specifically described herein.

What I claim as new and desire to be secured by Letters Patented in the United States is:

1. A settable fluidic counter comprising:

a first pure fluid amplifier and a second pure fluid amplifier, each of said amplifiers including a first control input, a second control input, a power input, a first output and a second output;

means connecting said first and said second outputs of said second amplifier respectively to said first and said second control inputs of said first amplifier such that a control loop is formed;

first and second means connected to said first and second control inputs of said second amplifier for applying set pulses to said settable fluidic counter; and means for providing feedback paths from the first and second outputs of said first amplifier respectively to said first and second control inputs of said second amplifier such that when a set pulse is applied to one of said means connected to said first and second control inputs of said second amplifier and then removed therefrom flow will aspirate in such a manner that the first amplifier output will remain in a set condition and be prepared to change its mode of operation upon receipt of a count pulse.

2. A settable fluidic counter as in claim 1 wherein a pulse entering said power input of said second amplifier will join an existing setting pulse such as to continue to influence the flow of the power jet of said first amplifier in the direction it would flow without said entering pulse.

3. A settable fluidic counter as in claim 1 wherein said count pulse is applied to the power jet input of said second pure fluid amplifier.

4. In combination, a plurality of settable fluidic counter stages as defined in claim 1 wherein each of said counter stages may be randomly set and when the setting pulses are removed therefrom in any order said counter stages will remain stably set with the desired number therein.

5. A settable fluidic counter as in claim 1 wherein means are provided for venting all of the flow in the proper feedback path when a respective setting pulse is removed such that flow on the side of said control loop nearest said feedback path is aspirated and thereby lowers the pressure thereof.

6. A settable fluidic counter as in claim 5 wherein said power input of said first fluid amplifier will also aspirate flow on the side of said control loop nearest said feedback path and thus lower the pressure thereof.

7. A settable fluidic counter as in claim 6 wherein said first pure fluid amplifier is provided with venting means for exiting excessive flow from said power jet thereof.

8. A settable fluidic counter as in claim 6 wherein resistance means is provided in each of said feedback paths for preventing both instability and oscillation of said settable fluidic counter.